April 7, 1925.
H. G. KIMBER
RAKE
Filed Aug. 8, 1922
1,532,764
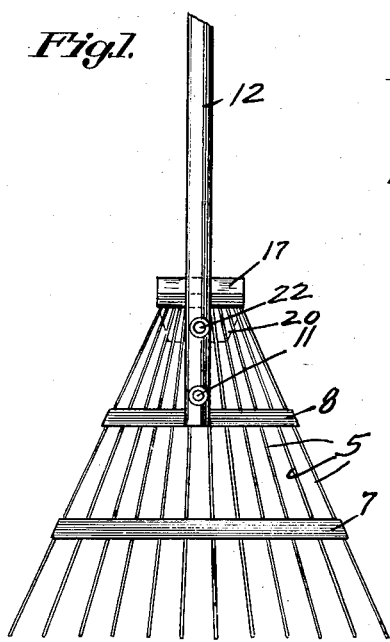
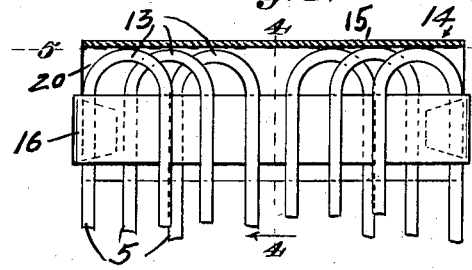
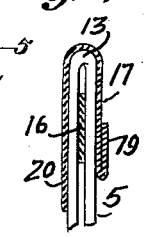
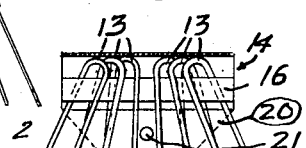
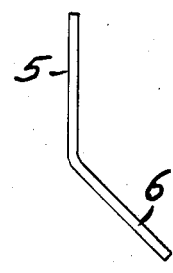
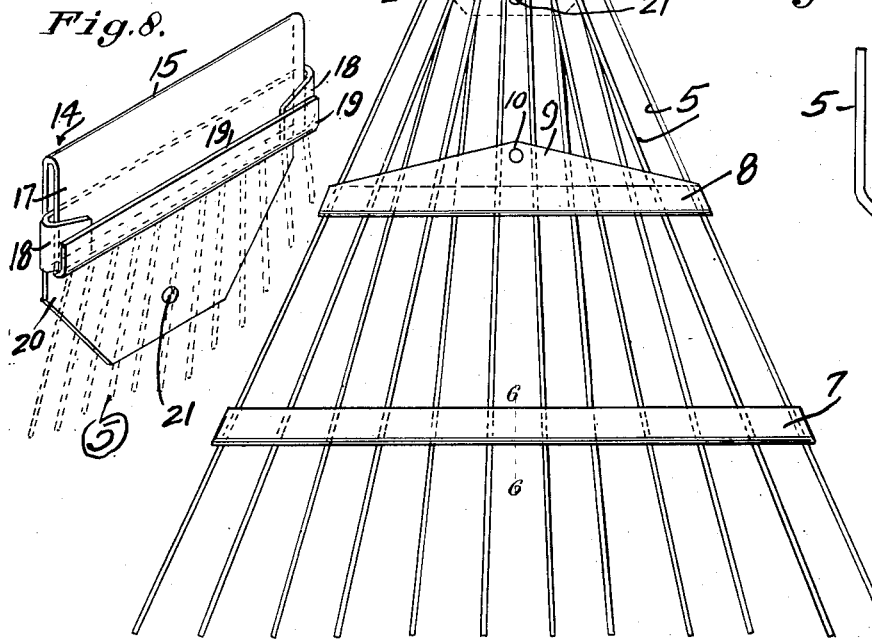
Inventor,
H. G. KIMBER
By
Attorneys.

Patented Apr. 7, 1925.

1,532,764

UNITED STATES PATENT OFFICE.

HERBERT G. KIMBER, OF OAKLAND, CALIFORNIA.

RAKE.

Application filed August 8, 1922. Serial No. 580,468.

*To all whom it may concern:*

Be it known that I, HERBERT G. KIMBER, a citizen of the United States, and resident of Oakland, county of Alameda, State of California, have invented a new and useful Rake, of which the following is a specification.

My invention relates in general to garden and the like implements and has reference more particularly to rakes of the wire type.

The primary object of my invention is to produce a rake (preferably of metal with exception perhaps of the handle, which may be wood) of cheap and durable construction, having few parts, and with the parts cooperating one with the other in such a manner that the rake may be quickly and conveniently assembled thus enabling large numbers of them to be made up with a saving of labor and material.

The preferred embodiment of the rake is illustrated in the accompanying drawing in which:

Figure 1 is a view in plan of my improved rake completely assembled;

Figure 2 is a view in plan of the tines and spacing means and showing the anchoring means for the tine ends in sections;

Figure 3 is a sectional view on the line 3—3, Figure 5;

Figure 4 is a sectional view on the line 4—4, Figure 3;

Figure 5 is a sectional view on the line 5—5, Figure 3;

Figure 6 is a sectional view on the line 6—6, Figure 2;

Figure 7 is a detail view of one of the tines, and

Figure 8 is a detail perspective view of the tine holding means.

Referring now to the drawing in detail, I prefer to use a plurality of looped tines 5 arranged in fan formation with their free ends 6 turned downwardly. The tines are spaced apart by spacers 7 and 8 the same being made preferably by bending metal strips to leave a channel member and with holes made in the bent shoulders of the members through which the tines pass. The strip 8 is cut with an apron like extension 9 on one side and having a hole 10 to receive a bolt or the like 11 for attaching the extremity of the handle 12.

The holding or anchoring means for the looped ends 13 of the tines preferably comprises a plate 14 bent as at 15 around the looped ends 13 and extending along opposite sides of the tines and a strip 16 which is threaded through the loops of the tines with its extremities extending beyond the side edges of the plate 14 and turned back upon the face 17 of the plate as at 18. The end of the face 17 of the plate is likewise turned back as at 19 to overlie the turned ends 18 of the strip as best shown in Fig. 8. The opposite face 20 of the plate 14 extends forward of the tines and preferably terminates in means substantially the same as on the apron 9 of the strip 8 for fixing the handle 12. This means comprises a hole 21 to receive the bolt 22. It is of course understood that after the strip 16 and the plate 14 have been assembled with the tines, the bends are pressed as flat as possible so that both faces 17 and 20 of the plate are pressed flush against the opposite sides of the tines.

The bent shoulder 15 will prevent the tines slipping in one direction since it will provide an abutment as shown best in Fig. 2. The strip 16 will prevent the tines slipping forward and the two faces of the plate will prevent the tines from turning. In assembling the holding or anchoring means the tines may first be arranged and the strip 16 is then passed through the looped ends 13 and the strip ends bent back. The end 19 of the plate is then turned back and the plate drawn through the turned back ends of the strip until its turned back edge 19 interlocks with the strip ends and the plate is then bent around the looped ends of the tines and the handle fixed in place as previously mentioned.

I claim:

1. In a rake, a plurality of tines, said tines having their attaching ends each formed with a return bend, holding means for said tines comprising a plate bent to lie against opposite sides of the tines and also extending over the attaching ends, and a strip extending parallel to the plate through all the return bends of the tines and secured to the plate.

2. In a device of the class described, a plurality of tines produced from looped wires, the tines being bunched together in fan like formation, holding means for said tines comprising a plate folded over the looped ends of the tines and extending along opposite sides thereof, and means extending transversely of the rake through the looped ends of the tines and between the folded surfaces of said plate and engaging opposite edges of the plate.

3. In a device of the class described, a plurality of tines produced from looped wires, the tines being bunched together with their looped ends arranged in fan like formation, holding means for said tines, comprising a plate folded over the looped ends of the tines and extending along opposite sides thereof, a strip extending transversely of the rake through the looped ends of the tines between the folded surfaces of said plate, the ends of said strip projecting beyond the side edges of the plate and folded back upon one face of the plate, and one end of the plate being folded to overlie the folded ends of the strip.

4. In a device of the class described, a plurality of tines produced from looped wires, the tines being bunched together with their looped ends arranged in fan like formation, holding means for said tines comprising a plate folded over the looped ends of the tines and extending along opposite sides of the tines, a strip extending transversely through the looped ends of the tines between the folded plate, the ends of said strip projecting beyond the side edges of the plate and turned over upon one face of the plate, one end of the plate being folded to overlie the turned ends of the strip, and spacing means for the tines presented across the same for holding the tines in spaced formation.

HERBERT G. KIMBER.